Sept. 28, 1971 E. KOST ET AL 3,608,161
CLAMPING MEANS FOR CLAMPING AND HOLDING HOLLOW
BODIES PARTICULARLY TUBES
Filed April 29, 1970 3 Sheets-Sheet 1
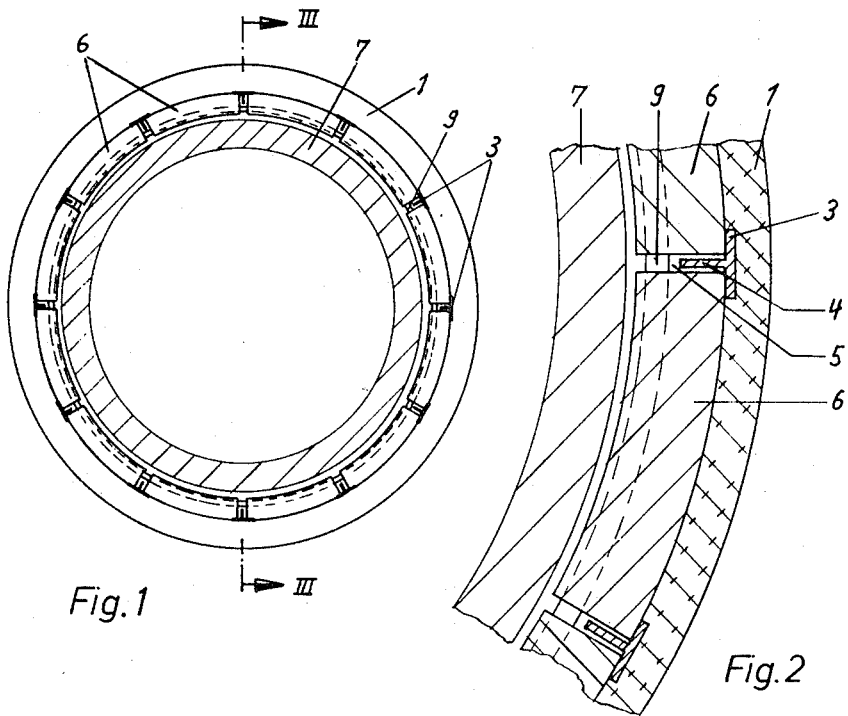
Fig.1
Fig.2
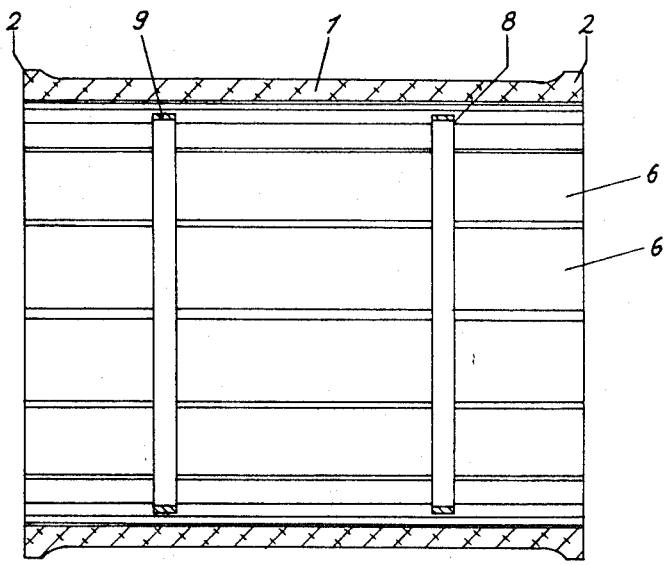
Fig.3
INVENTORS
ERWIN KOST ET AL.
BY Holman, Glascock,
Downing & Seebold
ATTORNEYS

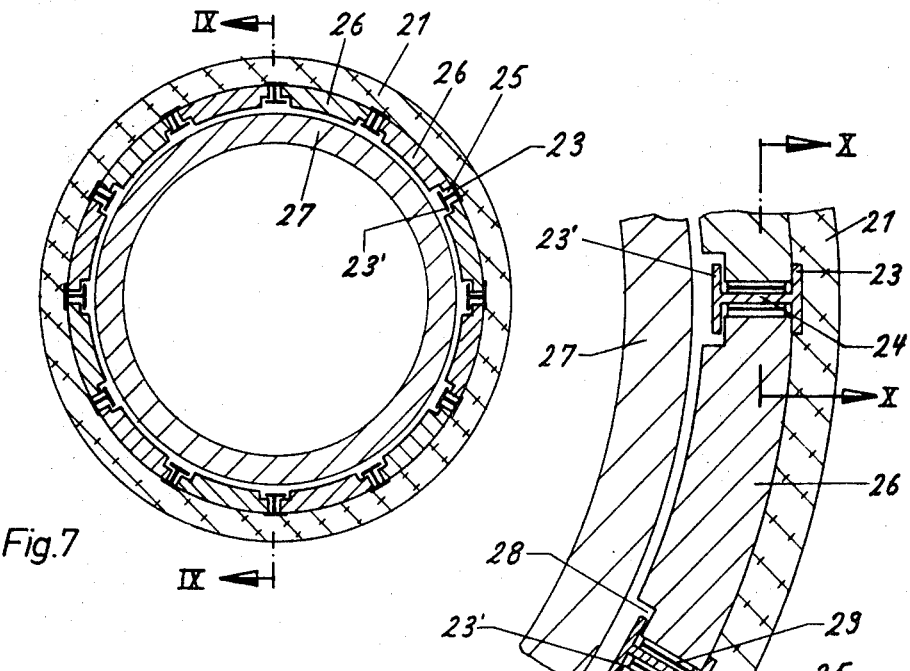
Fig. 7
Fig. 8
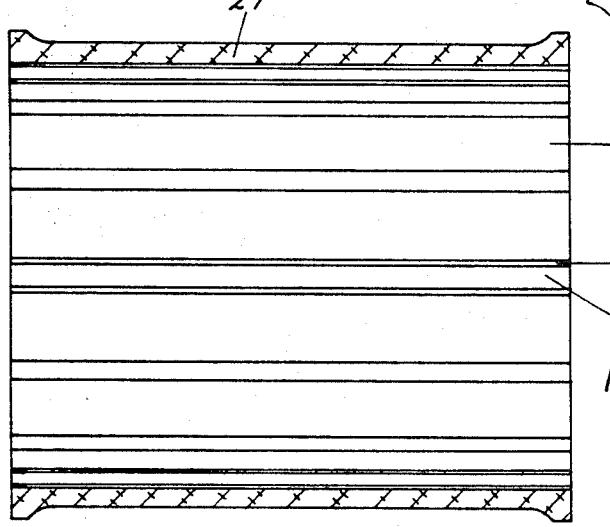
Fig. 9
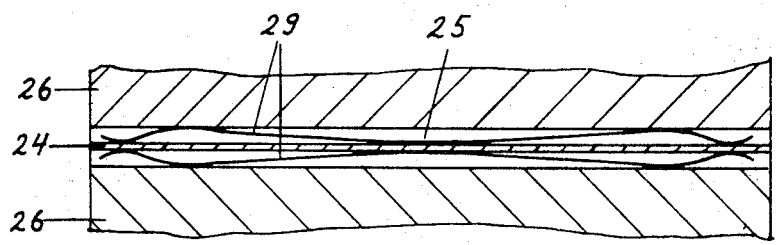
Fig. 10
INVENTORS
ERWIN KOST ET AL.
ATTORNEYS

United States Patent Office 3,608,161
Patented Sept. 28, 1971

3,608,161
CLAMPING MEANS FOR CLAMPING AND HOLDING HOLLOW BODIES PARTICULARLY TUBES
Erwin Kost, Osterath, and Bernhard Zeuch, Dusseldorf, Germany, assignors to Schloemann Aktiengesellschaft, Dusseldorf, Germany
Filed Apr. 29, 1970, Ser. No. 32,818
Claims priority, application Germany, May 2, 1969, P 19 22 497.6
Int. Cl. B23b 31/30
U.S. Cl. 24—263IH
6 Claims

ABSTRACT OF THE DISCLOSURE

Clamping means for clamping and holding hollow bodies, such as tubes, against either inwardly or outwardly acting fluid pressure, comprising a cylindrical resilient sealing sleeve, a gripping member consisting of annularly arranged segmental clamping pieces of a material harder than that of the sealing sleeve, slightly spaced apart, supporting means being provided for holding the segmental sealing pieces in their annular position when the fluid pressure is released. The gaps between the segmental clamping pieces are each covered throughout its length by a plate, moulded in or stuck onto the sleeve material, each plate being given a T-shaped profile by the addition of a web extending perpendicularly from the plate into the gap.

---

This invention relates to clamping means for clamping and holding hollow bodies, particularly tubes, which exert a clamping effect either inwards from the exterior or outwards from the interior, consisting of a cylindrical resilient sealing sleeve, which can be supplied, on its outer or inner periphery, with pressure fluid, and with which, upon its wall opposed to the action of pressure fluid, are associated individual segmental clamping pieces annularly arranged with axial gap spacing, of a material harder than that of the sealing sleeve, and wherein supporting means hold in their annular position the segmental clamping pieces when the sealing sleeve is relieved of the pressure medium.

It is known, from German published specification No. 1,268,458, to arrange a number of bar-shaped clamping pieces of rectangular or trapezoidal cross section, which are separated from one another by gaps, as a cylindrical gripping member inside a sealing sleeve that can be acted upon with a pressure medium. In this case the bar-shaped clamping pieces, which are arranged in a groove provided on their inside, after the relieving of the pressure medium, are brought and held upon the sealing sleeve in their original annular position. Leaf springs provided in the gaps assist this operation. The bar-shaped clamping pieces may also, in the production of the sealing sleeve be moulded on the internal surfaces thereof by means of profiles of different shapes, for instance dovetail-shaped, or may be held in longitudinally extending grooves located on the internal surface of the sealing sleeve.

The plurality of such bar-shaped clamping pieces also permits, with small gap spacings, a sufficient freedom of movement, in a radial direction of the entire annular gripping member formed from the clamping pieces.

There still remains the disadvantage that at the very high pressure of the pressure medium upon the sealing sleeve, notwithstanding everything, sleeve material can still penetrate into the gaps. Also the plurality of bar-shaped clamping pieces yields higher manufacturing costs, and nevertheless does not prevent sleeve material being able to penetrate, at very high pressures, even now, into a plurality of small gaps.

The problem of the invention is therefore, even at extremely high pressures of pressure media upon a sealing sleeve, to prevent the penetration of sleeve material into the gaps between the individual bar-shaped clamping pieces that form an annular gripping member, and at the same time to reduce the number of the clamping pieces and to fix their relative positions.

According to the invention this aim is attained by covering the gaps between the segmental clamping pieces, throughout their length, by means of plates moulded in or stuck onto the surface of the adjoining sealing-sleeve material, each plate, throughout its length, being provided in the middle, perpendicularly to its surface, with a web extending into the gap.

In consequence of the covering of the gaps by the plates, and of the enlargement, thereby rendered possible, of the spaces between the segmental clamping pieces, the number of segmental clamping pieces can be reduced to a fraction of those hitherto needed. For instance should a gap spacing, hitherto, at very high pressures, not be allowed to fall below 0.2 mm., there is now the possibility of selecting the gap widths at will, according to the method of employment, for instance 4 mm. The number of segmental clamping pieces is thereby reduced to one-twentieth of the number hitherto necessary.

Furthermore the plates for covering the gaps, are now employed at the same time, owing to the construction as a T-profile with the web for the exact locating of the segmental clamping pieces, which are now reduced in number.

With clamping means acting outwards from within, for instance when clamping a hollow body from within, the segmental clamping pieces being arranged on the periphery of the sealing sleeve, there is provided, in a further development of the invention, as supporting means for the central holding of the segmental clamping pieces, at least one resilient ring as a tension member in an annular groove arranged on the outside of the segmental clamping pieces. For strengthening, a worm spring may be inserted in the resilient ring.

In order to ensure, with the clamping means hitherto usual, with a gripping member acting radially inwards from without, a light holding of the segmental clamping pieces upon pressure on the outside of the sealing sleeve being relieved, the web is provided, in a further development of the invention, on the side opposite to the plate, as a supporting means, with a further plate, as a second flange of a double T-shaped profile, and the segmental clamping pieces are accommodated in the channel-shaped recesses to right and left of the web (the segmental clamping piece being provided, on their sides facing the hollow bodies, on the longitudinal edges, with recesses, which correspond in depth at least to the plate or flange thickness of the double-T profile, with the addition of a measure for the permissible wear of the segmental clamping pieces in consequence of the clamping, and which correspond in breadth to at least the flange breadth of the double-T profile, with the addition of the measure for the maximum reduction in size of the gaps between the clamping pieces when clamping.

In this way the segmental clamping pieces are held, as an annular gripping member, when the sealing sleeve is unloaded from the pressure medium, without the spring ring or rings otherwise usual, which are arranged in grooves on the internal wall surface of the segmental clamping pieces which form the gripping member, by means of the further plates facing the hollow body, in their annular position.

For pushing the individual segmental clamping pieces apart, and for accurately fixing, there are provided, in a further development of the invention, between the web of the double-T profiles and the longitudinal sides of the adjacent segmental clamping pieces, elements resilient in their length, which are advantageously constructed as leaf springs.

Embodiments of the invention are further described hereunder by way of example with reference to the accompanying drawings, in which:

FIG. 1 shows in cross-section a sealing sleeve to which external fluid pressure can be supplied, with T-shaped gap coverings between segmental clamping pieces, and a tube (in section) to be clamped from the exterior;

FIG. 2 shows a sector of FIG. 1 in section, on a larger scale;

FIG. 3 shows a longitudinal section on the line III—III of FIG. 1, but without the tube;

FIG. 7 shows a cross-section of an externally supplied sealing sleeve with double-T-shaped gap coverings between the segmental clamping pieces, and a tube clamped therein;

FIG. 8 shows a sector of FIG. 7 on a larger scale;

FIG. 9 shows a longitudinal section on the line IX—IX of FIG. 7, but without the tube to be clamped; and FIG. 10 shows a portion of FIG. 8 in section on the line X—X.

Figure 4:
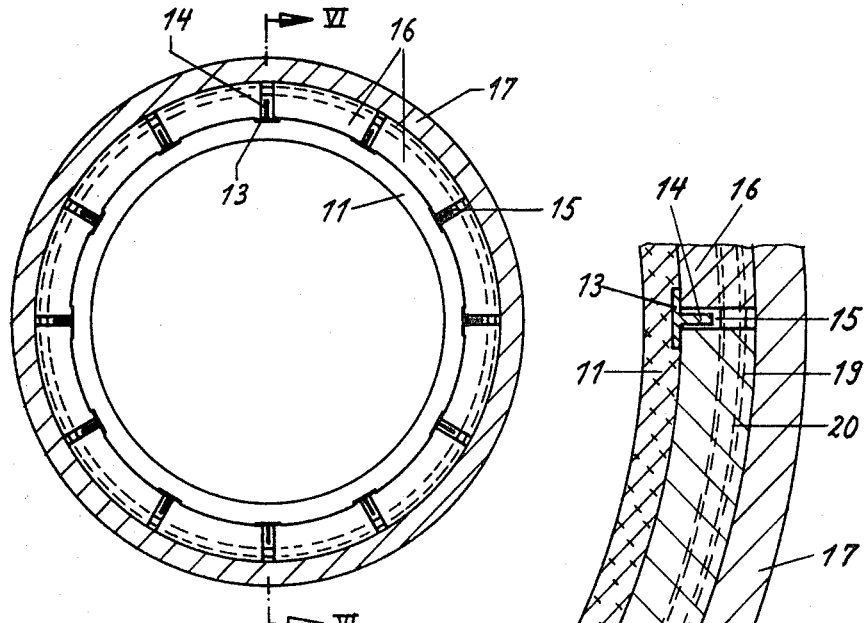
FIG. 4 shows a cross-section of a sealing sleeve which can be supplied with fluid under pressure from within, with T-shaped gap coverings between segmental clamping pieces and a tube (in section) to be held against pressure from within.

A cylindrical sealing sleeve 1 of a gripping means, (FIG. 1), to be acted upon externally by a pressure medium which forms, in a casing not shown, with its enlarged ends 2, an annular space, carries, on its inner side, T-shaped plates 3, moulded in or struck on to the surface. Webs 4 of these plates 3 project into gaps 5 between segmental clamping pieces 6 bearing circularly against the internal wall surface of the sealing sleeve 1, the plates 3 covering the gaps 5. The segmental clamping pieces 6 consist of a harder material mostly of a metallic nature. The segmental clamping pieces 6 together constitute an annular gripping member, centrally surrounding a tube 7 to be clamped. In the internal wall surface of the segmental clamping pieces 6, rectangular grooves 8 extend in a peripheral direction, and in these grooves spring rings 9 are placed, in order to lift the segmental clamping pieces centrally away fro mthe tube 7 to be clamped, as shown in FIGS. 2 and 3, after the pressure on the sealing sleeve 1 has been relieved.

Figure 5:
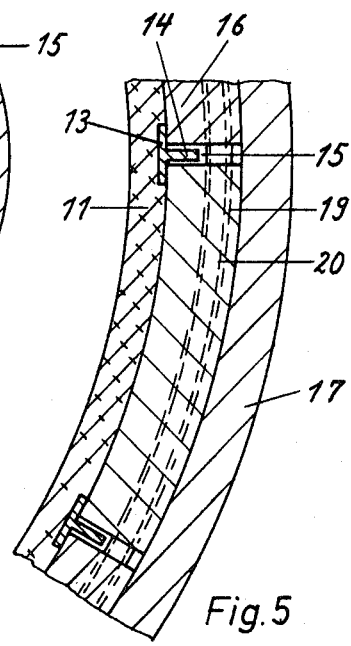
FIG. 5 shows a sector of FIG. 4, in section on a larger scale.
Figure 6:
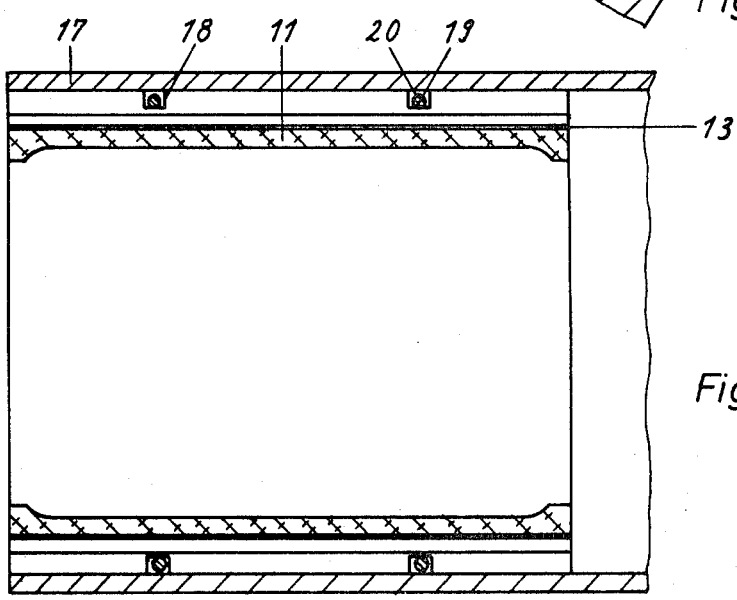
FIG. 6 shows a longitudinal section on the line VI—VI of FIG. 4.

A sealing sleeve 11, acted upon from within by pressure medium, is shown by FIGS. 4, 5 and 6. The segmental clamping pieces 16 that form the gripping member surround the sealing sleeve 11, and clamp a tube 17 from within. In the external wall surface of the sealing sleeve 11, T-shaped plates are moulded in or stuck on the web 14 of which projects into the gaps 15 between the segmental clamping pieces 16. In the external wall surface of the annularly assembled segmental clamping pieces 16, peripheral grooves 18 are provided, in which are placed resilient rings 19 as tension members, which may be reinforced by a worm spring 20.

In FIGS. 7 to 9 is shown a sealing sleeve 21, to be acted on from the outside with pressure medium. On the inner periphery of this sleeve T-shaped plates 23 are again moulded in or stuck on the surface, and these project with their webs 24 into gaps 25 between segmental clamping pieces 26. Each web 24 carries, on the edge remote from the plate 23, a second plate 23'. The plates 23 and 23' form, with the web, a double-T or H profile. Into the channel-shaped intervening spaces to the right and left of the web 24 engage the longitudinal sides or edges of the segmental clamping pieces 26. These are provided, on their longitudinal edges adjacent to the tube 27, with rectangular recesses 28. These recesses 28 correspond in depth at least to the thickness of the plates or flanges 23' plus a dimension for the wear of the segmental clamping pieces 26 resulting from the clamping upon the tube 27, and in their breadth they correspond at least to the breadth of the plates or flanges 23' of the doube-T profile, plus the dimension for the maximum reduction in the width of the gaps 25 resulting from clamping of the tube 27.

Between the longitudinal sides of the segmental clamping pieces 26 and the webs 24 are provided tangentially acting leaf springs 29, which, upon the sealing sleeve 21 being unloaded after a clamping operation, bring the segmental clamping pieces 26 back into their original annular position, shown in FIGS. 8 and 10. A special spring ring, with grooves let into the internal wall surface of the clamping pieces 26 may here be omitted. This gives rise to a smooth internal surface extending in an axial direction.

We claim:

1. Clamping means for clamping and holding hollow bodies, particularly tubes, against fluid pressure, comprising: a cylindrical resilient sealing sleeve, on one peripheral surface of which the fluid pressure is to act, a gripping member consisting of a ring of segmental clamping pieces, slightly spaced apart of a material harder than that of the sealing sleeve, supporting means for holding the segmental clamping pieces in their annular position when the fluid pressure is released, plates covering the gaps between the segmental sealing pieces, each plate being fixedly located relatively to the adjacent sealing-sleeve material, and covering the axial gap between two adjacent segmental sealing pieces throughout the length of the said gap, together with a central web extending into the said gap, perpendicularly to the said plate.

2. Clamping means as claimed in claim 1, the said supporting means for holding the segmental clamping pieces in their annular position, when the said fluid pressure is an outwardly acting internal pressure, comprising at least one resilient tension ring lodged in an annular groove provided in the external surface of the segmental clamping pieces.

3. Clamping means as claimed in claim 2, further comprising a coil spring reinforcing the said resilient tension ring.

4. Clamping means as claimed in claim 1 for withstanding external pressure, each web comprising, along the edge opposite to its associated plate, thus forming a double-T-shaped or H-shaped cross-section, providing two channel-shaped recesses for the accommodation of opposite edges of two adjacent segmental clamping pieces, and the said segmental clamping pieces being furthermore formed with recesses in the surface facing the hollow body, to accommodate the said second plates, the depth of these recesses being somewhat greater than the thickness of the said second plates to allow for the permissible wear of the segmental clamping pieces in consequence of the clamping, and the width of the recesses being somewhat greater than the breadth of the said second plates, to allow for the maximum reduction in the gap spacing when clamping.

5. Clamping means as claimed in claim 4, further comprising resilient elements extending lengthwise between the webs of the T-shaped members and the longitudinal sides of the adjacent segmental clamping pieces.

6. Clamping means as claimed in claim 5, the said resilient elements being leaf springs.

References Cited

UNITED STATES PATENTS

| | | | |
|---|---|---|---|
| 1,942,366 | 1/1934 | Seamark | 24—263HS |
| 2,016,652 | 10/1935 | Poole | 279—4 |
| 2,583,117 | 1/1952 | Piperoux et al. | 279—4 |
| 2,934,804 | 5/1960 | Suderow | 24—263HS |
| 3,253,854 | 5/1966 | Hollander | 24—263 |

DONALD A. GRIFFIN, Primary Examiner

U.S. Cl. X.R.

279—4